United States Patent [19]

Tureck et al.

[11] 4,183,644
[45] Jan. 15, 1980

[54] PHOTOGRAPHIC BACKGROUND DEVICE

[75] Inventors: Albert Tureck, 3728 W. Enfield, Skokie, Ill. 60076; Arthur Cox, Park Ridge, Ill.

[73] Assignee: Albert Tureck, Skokie, Ill.

[21] Appl. No.: 892,149

[22] Filed: Mar. 31, 1978

[51] Int. Cl.² ............... G02B 27/14; G03B 15/00; G03B 29/00
[52] U.S. Cl. .................... 354/77; 350/174; 354/291
[58] Field of Search ............ 354/77, 291, 295, 110; 352/47, 89; 350/174

[56] References Cited

U.S. PATENT DOCUMENTS

| | | | |
|---|---|---|---|
| 2,076,103 | 4/1937 | Thorner | 352/89 |
| 2,619,872 | 12/1952 | Shepard | 350/174 X |
| 2,821,105 | 1/1958 | Walker | 350/174 |
| 3,366,438 | 1/1968 | Hartman | 352/47 |
| 3,376,800 | 4/1968 | Faasch | 354/77 |
| 3,920,320 | 11/1975 | Ellis et al. | 352/89 |

FOREIGN PATENT DOCUMENTS 2610399 9/1977 Fed. Rep. of Germany ........... 354/291

Primary Examiner—L. T. Hix
Assistant Examiner—Thomas H. Tarcza
Attorney, Agent, or Firm—George H. Gerstman

[57] ABSTRACT

A photographic background device enables a photographer to include a scene reproduced on a film transparency as background for photographed subjects. A transparency is illuminated while a beam splitter mirror directs light from the illuminated transparency to the camera lens, while allowing light from the subject to pass through the mirror to the camera lens. A movable lens system of positive power is provided to allow the transparency image to appear in focus at the lens. Vignetting is alleviated by locating a concave mirror on the side of the beam splitter opposite the side on which the movable lens system is located. In this manner, the illuminated film transparency image will pass through the beam splitter, be reflected by the concave mirror back to the beam splitter and be reflected from the beam splitter to the camera lens.

13 Claims, 10 Drawing Figures

PHOTOGRAPHIC BACKGROUND DEVICE

BACKGROUND OF THE INVENTION

This invention relates to an improved system for providing a photographed subject with selected backgrounds, and more particularly, to a system in which a device is mountable directly to a camera whereby a subject may be photographed with a desired background not requiring the use of painted backdrops, rear projection screens, front projection screens, or the like.

Selection of photographic backgrounds is very important to the photographer, particularly to the commercial portrait photographer who must rely on such backgrounds to make his work consistently interesting and appealing to the eye. Selected photographic techniques have been heretofore used to eliminate or minimize the intrusion of an objectionable background in a photograph. One such technique involves shooting at as wide open a lens aperture as is practicable. In this manner, the depth of field of lens used is minimized and the background will appear to be an indistinguishable blur, when the subject is in focus. Such techniques, however, add nothing to overcome the problem of including an otherwise undistinguishable background as part of the finished pictures.

The use of a painted backdrop is as old as the art of commercial photography itself, to which countless tintypes and daguerretypes will attest. Such backdrops are, of necessity, limited in subject matter, difficult to create and maintain, cumbersome to erect and burdensome to carry. Thus the photographer was fairly restricted to the confines of his own studio, and likewise limited in the number of available backdrops he could offer to his clients.

A more recent innovation has been the use of photographic screens onto which transparencies may be projected to produce a desired background. One such projection technique involves a translucent screen and a slide projector mounted at its rear. The image thus appears on the screen's front surface. With the slide so projected, the subject stands in front of the screen and the photographer proceeds conventionally with his shooting.

While offering a somewhat more portable and flexible backdrop system, the rear projection approach requires erection of a screen, positioning of the projector at a distance behind the screen sufficient to enable the projected image to fill the screen, sources of electrical power to operate the projector, and elaborate and carefully controlled front lighting techniques to illuminate the subject without "washing out" the projected image.

A variation of this technique involves front projecting an image onto a screen through a beam splitter mirror which directs the reflected screen image back to a camera. The subject to be photographed is positioned coaxially with the lens of the camera at a position beyond the beam splitter. Such an apparatus is described in U.S. Pat. No. 3,366,438 issued to H. W. Hartman.

A variation of this procedure may be seen in U.S. Pat. No. 3,920,320 issued to Ellis and Ryan, where the transparency projector, the beam splitting mirror and the camera have been combined on a single chassis.

As is evident from a reading of both patents, a projection screen is still required and care must be taken in lighting and in projecting the image onto the screen to assure that shadows from the subject positioned before the screen will not intrude onto the projected backdrop.

Problems are also encountered in adequately lighting the subject while maintaining the sharpness and clarity of the projected background. It may also be seen that, while the two patents discussed above offer some significant advantages, the portability and ease of use of each described apparatus is somewhat limited due to the cumbersome equipment lighting and projection screen involved.

A somewhat more compact attachment, for causing a grid or other desired reference pattern to be projected onto the film in the camera and also onto the viewing screen of the camera's viewfinder, at the same time that a subject is being photographed by the camera, is disclosed in Faasch U.S. Pat. No. 3,376,800. Faasch discloses a beam splitter mirror for reflecting a transparency image to the camera lens and for allowing the subject to simultaneously be photographed through the beam splitter. We have discovered, however, that when a beam splitter mirror is interposed between the camera lens and a lens for focusing a transparency image, vignetting may occur. We have also discovered a novel system for alleviating such vignetting, by effectively focusing the entrance pupil of the camera lens approximate the exit pupil of the lens which focuses the transparency image.

Therefore, it is an object of the present invention to provide simple apparatus for combining selected film transparencies as backgrounds with subjects to be photographed, with the problem of vignetting being alleviated.

Other objects and advantages of the present invention will become apparent as the description proceeds.

SUMMARY OF THE INVENTION

In accordance with the present invention, apparatus is disclosed for providing a photographed subject with selected backgrounds, with the backgrounds being maintained on film transparencies. The apparatus has one portion thereof positionable adjacent a camera lens, means for holding a film transparency, means for illuminating the film transparency, beam splitter means, optical focusing means located between the film transparency and the beam splitter means, with the illuminating means being located on the side of the film transparency opposite the side on which the focusing means is located.

The improvement comprises a concave mirror located on the side of the beam splitter means opposite the side on which the optical focusing means is located. The beam splitter means has a partially reflective mirror surface and the beam splitter means is positioned to permit the illuminated film transparency image to pass through the beam splitter means, be reflected by the concave mirror back to the beam splitter means and be reflected from the beam splitter means to the camera lens. The concave mirror is operative to focus the entrance pupil of the camera lens approximate the exit pupil of the optical focusing means.

In the illustrative embodiment, the beam splitter means comprises a beam splitter cube in which the diagonal thereof is light-transmissive with a partially reflecting mirror surface. The optical focusing means comprises a first cylindrical lens for reducing astigmatism and a movable lens system of positive power. The beam splitter means is angled at a 45° angle with respect to the lens axis and extends from below the camera lens and upwardly and away therefrom.

A more detailed explanation of the invention is provided in the following description and claims, and is illustrated in the accompanying drawings.

DETAILED DESCRIPTION OF THE ILLUSTRATIVE EMBODIMENTS

Figure 4:
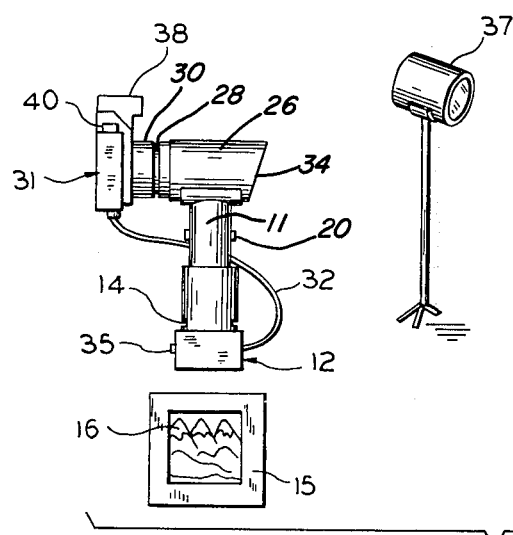
FIG. 4 is a schematic representation illustrating one technique of use of the device of FIG. 1.
Figure 4:
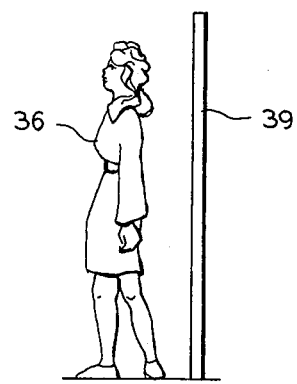
Figure 2:
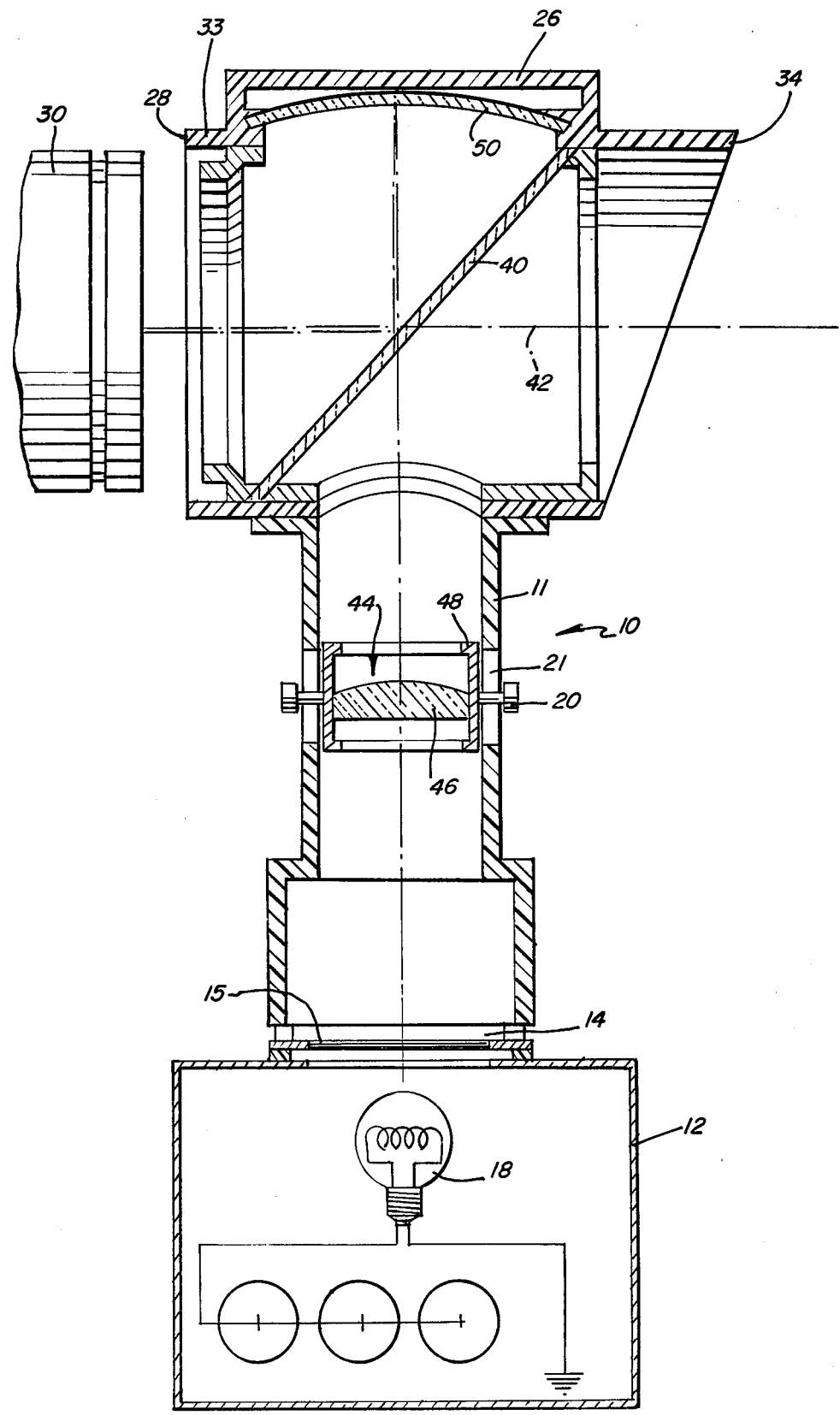
FIG. 2 is a cross-sectional view thereof.

Referring to the drawings, a photographic background apparatus 10 has a hollow housing 11 with slide retainer 14 and illumination base 12 positioned at one end. The illumination base 12 may contain an electronic flash which is synchronized with the shutter of a camera, as illustrated in FIG. 4, or it may contain a battery or household current-operated incandescent lamp 18, as illustrated in FIG. 2.

Apparatus 10 includes a mirror support housing 26, one end 28 of which faces the camera lens 30 of a camera 31 and the other end 34 of which is adapted to be aimed toward the subject whose photograph is being taken.

Housing 26 includes a sleeve 33 which is adapted for coupling to the camera lens 30. The housing also includes a beam splitter mirror 40, which is positioned at a 45° angle with respect to the axis 42 of the lens 30 and extends upwardly and outwardly from the bottom plane of lens 30 to the top plane thereof. Beam splitter mirror 40 is light-transmissive, preferably transparent, with a partially reflecting mirror surface. If desired, the beam splitting device may comprise a beam splitter cube in which member 40, which forms the diagonal of the cube, is light-transmissive with a partially reflecting mirror surface.

Housing 11 is provided with a slot 14 for receiving a transparency 15. Transparency 15 is used to provide a background image 16, when illuminated by lamp 18, as is described below.

A movable optical focusing means 44 is provided between the beam splitter 40 and the transparency 15. Optical focusing means 44 preferably comprises a movable lens system 46 of positive power. Lens system 46 may comprise a single convex lens as illustrated in FIG. 2, or may comprise a complex lens forming a positive power element. Lens 46 is mounted within a carrier 48 to which lugs 20 are connected for permitting the carrier 48 to be moved within slot 21 defined by housing 11.

Figure 1:
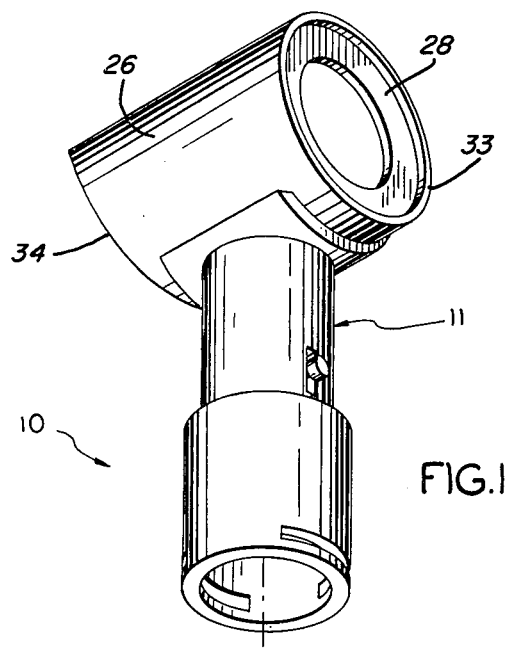
FIG. 1 is a perspective view of a photographic background device constructed in accordance with the principles of the present invention.
Figure 3:
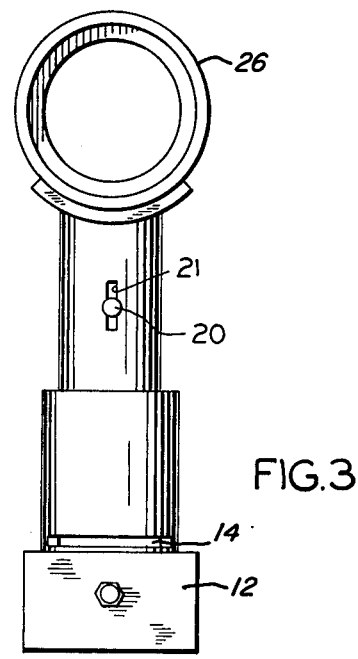
FIG. 3 is a front elevational view thereof.
Figure 5:
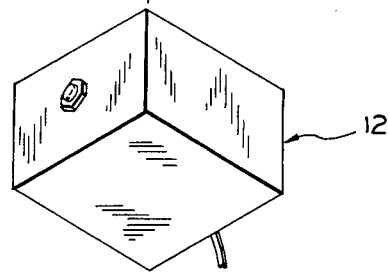
FIG. 5 is a representation of a completed photograph using the arrangement in FIG. 4.
Figure 5:
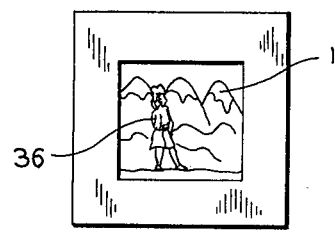

In order to permit access to lamp housing 12, housing 11 may be threadedly connected to the lamp housing 12 so that by unscrewing the housing 11 from the lamp housing 12 the disconnection can be made and access may be permitted within the lamp housing 12. For simplicity in construction, mirror housing 26 is preferably formed as a generally cylindrical construction and is fastened to housing 11 substantially as illustrated in FIGS. 1 and 3.

In order to alleviate vignetting, a concave mirror 50 is provided on the side of beam splitter 40 opposite the side on which focusing means 44 is located. Concave mirror 50 may take the form either of a front surface mirror, in which the reflecting surface is immediately accessed by the light from the transparency 15, or a rear surface mirror in which the concave reflecting surface is accessed only after the light from the transparency 15 has been refracted at an entrance face and has traversed a path in either glass or transparent plastic. The use of transparent plastic for the concave rear surface mirror is preferred for a low cost application, and is characterized by the fact that the entrance face referred to is substantially of planar form (see FIG. 7).

Concave mirror 50 is used to focus the entrance pupil of the camera lens in or near the exit pupil of lens system 46. The optical power of lens system 46 is such that when it is taken in conjunction with the optical power of concave mirror 50, the light from the transparency 15 after its reflection by the beam splitter 40, is brought to a common focus on the film plane of the camera as light which comes from the subject traverses the beam splitter 40 without reflection. Thus the image of the subject will pass to lens 30 through beam splitter 40 without reflection. The image of transparency 15 will be focused by lens system 46 and will pass through beam splitter 40 to concave mirror 50, be reflected back to beam splitter 40 and be reflected from beam splitter 40 to lens 30. By focusing the entrance pupil of the camera lens approximate the exit pupil of focusing lens 46, vignetting is alleviated.

Figure 6:
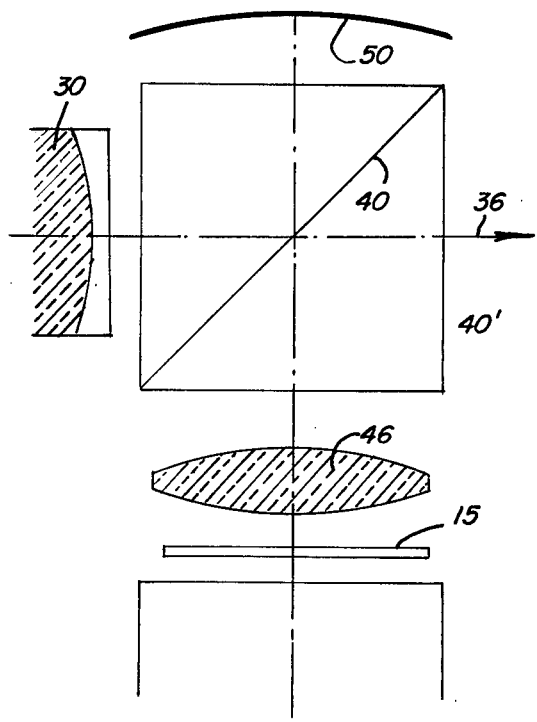
FIG. 6 is a schematic view of a background photographic device constructed in accordance with the FIG. 2 embodiment of the present invention.

A schematic representation of one embodiment of the invention is illustrated in FIG. 6, in which a beam splitter cube 40' has a transparent diagonal member 40 with a partially reflecting mirror surface. Beam splitter cube 40 is positioned between lens 30 and focusing lens 46 and concave mirror 50 is located on the side of beam splitter cube 40' opposite to the side on which focusing lens 46 is located. The image of subject 36 will pass through beam splitter 40, without reflection, to lens 30. The image of transparency 15, when illuminated, will pass through beam splitter 40, without reflection, and then be reflected back to beam splitter 40 by concave mirror 50 and thereupon be reflected to lens 30.

Figure 7:
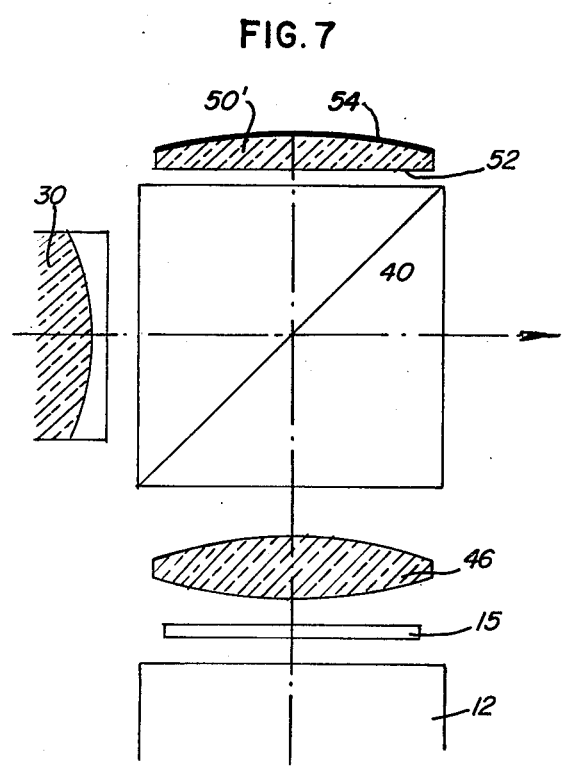
FIG. 7 is a schematic view of a photographic background device according to a modified form of the invention.

The embodiment of FIG. 7 is similar to the FIG. 6 embodiment, except that concave mirror 50' comprises a lens/mirror system having a planar bottom surface 52 and its top surface 54 having a reflective material, such as aluminum, deposited thereon. The apparatus of FIG. 7 operates similarly to the FIG. 6 apparatus, except that the concave reflecting surface 54 of concave mirror 50' is accessed only after the light from the transparency has been refracted at entrance face 52.

Figure 8:
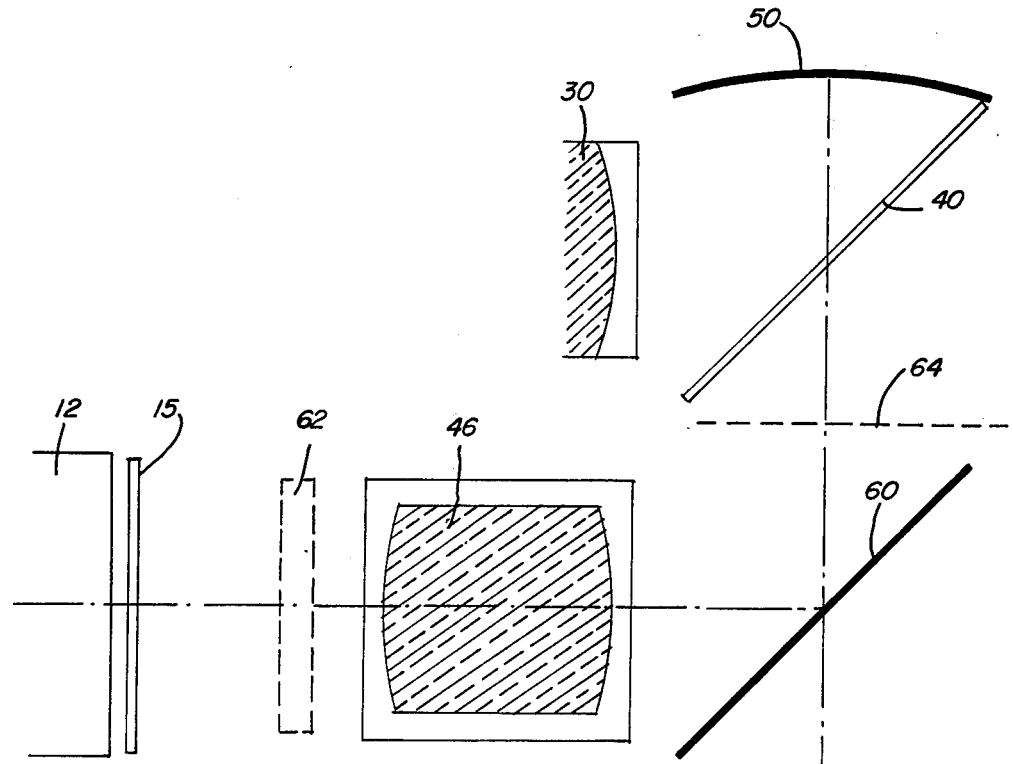
FIG. 8 is a schematic view of a photographic background device according to a further modified form of the invention.
Figure 9:
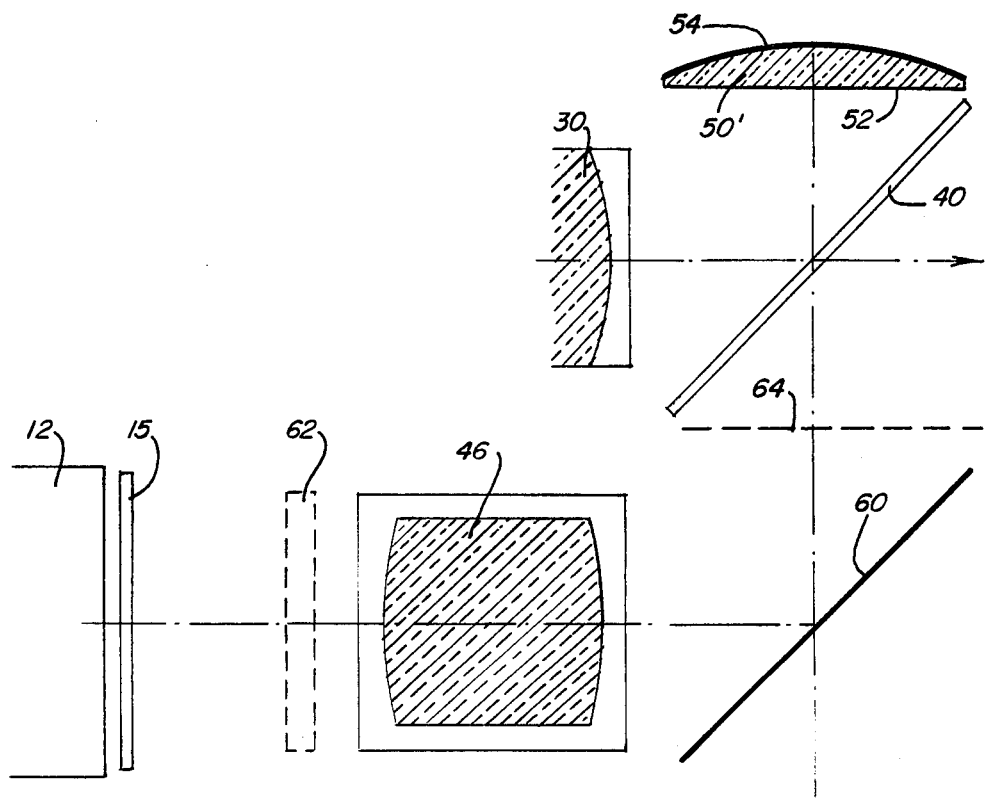
FIG. 9 is a schematic view of a photographic background device according to another modified form of the invention.

FIGS. 8 and 9 show a system in which light housing 12, transparency 15 and focusing means 46 extend horizontally. To this end, a mirror 60 is provided for reflecting the transparency image upwardly and through beam splitter 40, to concave mirror 50 where it is reflected back to beam splitter 40 and thereupon reflected to lens 30. In the FIGS. 8 and 9 embodiment, the optical focusing means includes a complex lens system 46 of positive power and a cylindrical lens 62 for reducing astigmatism. Lens 46 is actually movable to focus the transparency image.

The FIGS. 8 and 9 embodiments are similar, except that in the FIG. 8 embodiment, a concave mirror 50 is used for reflecting the transparency image back to beam splitter 40, while in the FIG. 9 embodiment, a concave mirror/lens system 50' is utilized. Concave mirror/lens system 50' has a generally planar bottom surface 52 and a mirrored top surface 54 upon which aluminum or the like is deposited, in the manner as described with respect to concave mirror/lens system 50' of the FIG. 7 embodiment.

In the FIGS. 8 and 9 embodiments, an intermediate image 64 is formed between mirror 60 and beam splitter 40, as illustrated. If desired, a ground glass member may be provided between mirror 60 and beam splitter 40 to receive the intermediate image 64.

Cylindrical lens 62 is optional and for highest quality it is useful in connection with a complex lens system 46 for reducing astigmatism. Although no limitation is intended, as a specific example a 25 watt illumination lamp 18 may be utilized and for most accurate results should be color corrected by means of filters or the like. The camera lens aperture should be set at F/2.8 or F/4. Mirror 50 may have a radius of curvature of 9.414 inches and, if a glass type, have a refractive index of 1.523 and a dispersion of 59.5 (Abbe No.). Lens 50' may have a thickness of 0.6 inch and have a clear aperture of 3 inches by 4 inches.

Beam splitter 40 may be a 4.25 inch×4.25 inch cube with the glass forming the beam splitter being 0.062 inch thick. Mirror 60 may be square having a 3 inch by 3 inch dimension and a thickness of ⅛ inch. Relay lens 46 may be a 2 inch F/1.9 lens or a 2 inch F/2 lens.

Figure 10:
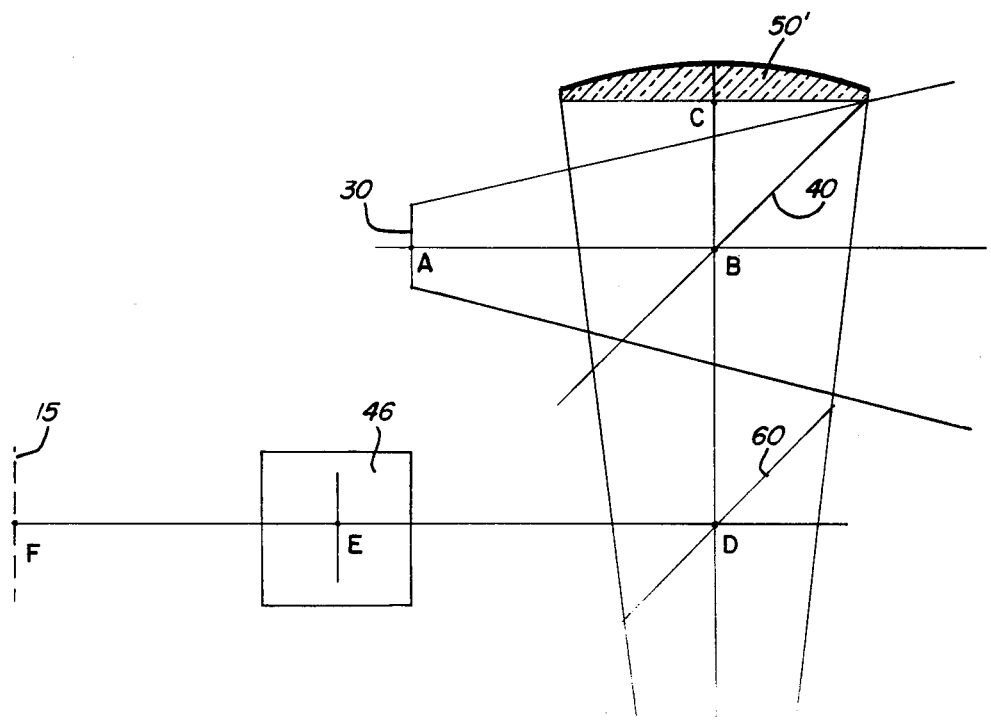
FIG. 10 is a schematic view of the FIG. 9 embodiment, for the purpose of showing an illustrative example of operable dimensions.

Illustrative dimensions between the parts, with reference to the diagram of FIG. 10, are as follows:

| Spacing | Distance In Inches |
| --- | --- |
| AB | 3.0 |
| BC | 1.5 |
| BD | 2.75 |
| DE | 3.75 |
| EF | 3.25 |

In utilizing the apparatus disclosed, with reference to FIG. 4 a subject 36 is placed adjacent a dark background 39, preferably a black background. Subject 36 is illuminated by means of natural illumination or photographic lamp 37. The device is attached to the camera lens as illustrated and transparency 15 having a desired background 16 thereon is inserted into slot 14. If the illumination housing 12 contains an electronic flash, the electronic flash is energized for synchronization with the camera shutter. The lens of the camera is adjusted to focus upon the subject 36 and lugs 20 are moved so that the transparency picture 16 will be focused by lens system 46 with respect to the camera lens.

If an electronic flash is utilized, the electronic flash is energized by switch 35 for synchronization with the camera shutter. When the camera shutter is actuated, the image of the subject will pass through beam splitter 40, without reflection, to camera lens 30. Simultaneously the image of background 16 will pass through beam splitter 40, without reflection, to concave mirror 50, be reflected back to beam splitter 40 and be reflected from beam splitter 40 to lens 30.

It can be seen that a simple apparatus has been provided for enabling desired backgrounds to be photographed with the subject, without the need for painted backdrops, rear projection screens, etc. Further, by locating the concave mirror as described above, vignetting is alleviated in a simple and effective manner.

Although illustrative embodiments of the invention have been shown and described, it is to be understood that various modifications and substitutions may be made by those skilled in the art without departing from the novel spirit and scope of the present invention.

What is claimed is:

1. Apparatus for providing a photographed subject with selected backgrounds, the backgrounds being maintained on film transparencies, the apparatus having a housing with one portion thereof positionable adjacent a camera lens, means carried by the housing for holding a film transparency, means carried by the housing for illuminating the film transparency, beam splitter means located within the housing, optical focusing means located in the housing between the film transparency and the beam splitter means, said illuminating means located on the side of the film transparency opposite the side on which the focusing means is located, the improvement comprising, in combination:

a concave mirror for alleviating vignetting located in the housing on the side of the beam splitter means opposite the side on which the optical focusing means is located;

said beam splitter means having a partially reflective mirror surface;

said beam splitter means being positioned to permit the illuminated film transparency image to pass through said beam splitter means, be reflected by said concave mirror back to said beam splitter means and be reflected from said beam splitter means to the camera lens; and said optical focusing means being positioned and operative to produce an intermediate film transparency image in front of said concave mirror.

2. Apparatus as described in claim 1, said beam splitter means comprising a beam splitter cube in which the diagonal thereof is light-transmissive with a partially reflecting mirror surface.

3. Apparatus as described in claim 1, said beam splitter means comprising an angled light-transmissive member having a partially reflective mirror surface, the angle being approximately 45° with respect to the camera lens axis and extending from below the camera lens and upwardly and away therefrom.

4. Apparatus as described in claim 1, said optical focusing means comprising a movable lens system of positive power.

5. Apparatus as described in claim 1, said illuminating means comprising an incandescent lamp.

6. Apparatus as described in claim 1, said illuminating means comprising an electronic flash synchronized with the shutter of the camera.

7. Apparatus as described in claim 1, said optical focusing means comprising a first cylindrical lens for reducing astigmatism and a movable lens system of positive power.

8. Apparatus as described in claim 1, including a mirror for reflecting the illuminated image from the optical focusing means through the beam splitter and to the concave mirror.

9. Apparatus as described in claim 1, said concave mirror comprising a lens/mirror combination.

10. Apparatus for providing a photographed subject with selected backgrounds, the backgrounds being maintained on film transparencies, the apparatus having a housing with one portion thereof positionable adjacent a camera lens, means carried by the housing for holding a film transparency, beam splitter means located within the housing, optical focusing means located in the housing between the film transparency and the beam splitter means, said illuminating means located on the side of the film transparency opposite the side on which the focusing means is located, the improvement comprising, in combination:

said beam splitter means comprising an angled light-transmissive member having a partially reflective mirror surface, the angle being approximately 45° and extending from below the camera lens and upwardly and away therefrom;

said optical focusing means comprising a movable lens system of positive power;

a concave mirror for alleviating vignetting located in the housing on the side of the beam splitter means opposite the side on which the otpical focusing means is located;

said beam splitter means being positioned to permit the illuminated film transparency image to pass through said beam splitter means, be reflected by said concave mirror back to said beam splitter means and be reflected from said beam splitter means to the camera lens, with the concave mirror being operative to focus the entrance pupil of the camera lens approximate the exit pupil of said optical focusing means; and said optical focusing means being positioned and operative to produce an intermediate film transparency image in front of said concave mirror.

11. Apparatus as described in claim 10, wherein said optical focusing means also includes a first cylindrical lens for reducing astigmatism.

12. A method for alleviating vignetting from apparatus for providing a photographed subject with selected backgrounds, the backgrounds being maintained on film transparencies, the apparatus having a housing with one portion thereof positionable adjacent a camera lens, means carried by the housing for holding a film transparency, means carried by the housing for illuminating the film transparency, beam splitter means located within the housing, optical focusing means located in the housing between the film transparency and the beam splitter means, the illuminating means located in the housing on the side of the film transparency opposite the side on which the focusing means is located, the steps comprising:

locating said beam splitter means at an angle of approximately 45° with respect to the axis of the camera lens and extending from below the camera lens and upwardly and away therefrom, with the beam splitter means comprising a light-transmissive member having a partially reflective mirror surface;

positioning a concave mirror in the housing on the side of the beam splitter means opposite the side on which the optical focusing means is located, so that the concave mirror is operative to focus the entrance pupil of the camera lens approximate the exit pupil of the optical focusing means; and positioning said optical focusing means to produce an intermediate film transparency image in front of the concave mirror.

13. A method as described in claim 12, including the further step of interposing an additional mirror for reflecting the illuminated image from the optical focusing means through the beam splitter and to the concave mirror.

* * * * *